(12) United States Patent
Vess et al.

(10) Patent No.: US 8,978,201 B2
(45) Date of Patent: Mar. 17, 2015

(54) ANTI-RATTLE SLEEVE FOR A HINGE JOINT

(71) Applicant: Delphi Technologies, Inc., Troy, MI (US)

(72) Inventors: David Jay Vess, Kokomo, IN (US); Przemyslaw Antos, Skawina (PL)

(73) Assignee: Delphi Technologies, Inc., Troy, MI (US)

( * ) Notice: Subject to any disclaimer, the term of this patent is extended or adjusted under 35 U.S.C. 154(b) by 43 days.

(21) Appl. No.: 13/961,998

(22) Filed: Aug. 8, 2013

(65) Prior Publication Data

US 2015/0040350 A1 Feb. 12, 2015

(51) Int. Cl.
*E05D 7/00* (2006.01)
*F16B 5/02* (2006.01)

(52) U.S. Cl.
CPC ............... *E05D 7/00* (2013.01); *F16B 5/0258* (2013.01); *Y10S 16/33* (2013.01)
USPC ........................................ 16/2.1; 16/DIG. 33

(58) Field of Classification Search
CPC .................................................. F16B 5/0258
USPC ........ 16/2.1–2.5, DIG. 33, DIG. 27; 411/902, 411/903
See application file for complete search history.

(56) References Cited

U.S. PATENT DOCUMENTS

| 624,150 | A | * | 5/1899 | Andrus | 16/2.1 |
|---|---|---|---|---|---|
| 2,170,718 | A | * | 8/1939 | Humphries | 16/2.1 |
| 3,164,054 | A | * | 1/1965 | Biesecker | 16/2.1 |
| 3,438,686 | A | | 4/1969 | Stone | |
| 4,522,378 | A | * | 6/1985 | Nelson | 16/2.1 |
| 4,951,349 | A | * | 8/1990 | Dietrich et al. | 16/228 |
| 5,397,206 | A | * | 3/1995 | Sihon | 411/544 |
| 5,735,631 | A | * | 4/1998 | Patzelt et al. | 403/378 |
| 5,953,961 | A | | 9/1999 | Stuedemann et al. | |
| 7,370,878 | B2 | * | 5/2008 | Nakazawa | 16/2.1 |
| 7,731,266 | B2 | * | 6/2010 | Selle | 296/107.01 |
| 8,091,175 | B2 | * | 1/2012 | Weiss et al. | 16/2.1 |
| 8,341,804 | B2 | * | 1/2013 | Yoshii et al. | 16/2.1 |
| 8,454,290 | B2 | * | 6/2013 | Schaser et al. | 411/544 |
| 2005/0220564 | A1 | * | 10/2005 | Hinson et al. | 411/353 |
| 2007/0119017 | A1 | * | 5/2007 | Trotter et al. | 16/2.1 |

(Continued)

FOREIGN PATENT DOCUMENTS

GB 2156469 A * 10/1985 ............. F16B 39/22

OTHER PUBLICATIONS

European Search Report dated Dec. 22, 2014.

*Primary Examiner* — Jeffrey O Brien
(74) *Attorney, Agent, or Firm* — Lawrence D. Hazelton

(57) ABSTRACT

An anti-rattle sleeve that includes a retention feature on a split end that extends radially from the body portion and a slot configured to allow the retention feature to be pressed through an opening. The sleeve also includes a flange portion opposite the split end that includes an inner bump configured to contact a surface of an object bracket and an outer bump configured to contact a surface of a mounting bracket. The inner bump and the outer bump are located relative to the slot such that the sleeve is deformed by the brackets in a manner effective to reduce relative motion between the object bracket and the mounting bracket when compressed between the brackets.

8 Claims, 3 Drawing Sheets

(56) References Cited

U.S. PATENT DOCUMENTS

| | | | |
|---|---|---|---|
| 2007/0192993 A1* | 8/2007 | Selle | 16/2.1 |
| 2007/0271728 A1* | 11/2007 | Byeon | 16/2.5 |
| 2008/0163453 A1* | 7/2008 | Joseph | 16/2.1 |
| 2009/0064454 A1* | 3/2009 | Anderson et al. | 16/2.1 |
| 2010/0139035 A1* | 6/2010 | Magennis et al. | 16/2.1 |
| 2011/0163904 A1* | 7/2011 | Alland et al. | 342/1 |
| 2011/0265286 A1* | 11/2011 | Paku et al. | 16/2.2 |
| 2011/0311333 A1* | 12/2011 | Schaser et al. | 16/2.1 |

* cited by examiner

ANTI-RATTLE SLEEVE FOR A HINGE JOINT

TECHNICAL FIELD OF INVENTION

This disclosure generally relates to an anti-rattle sleeve for a hinge joint, and more particularly relates to a sleeve that is deformed when the hinge joint is assembled to provide the anti-rattle feature.

BACKGROUND OF INVENTION

Plastic sleeves are commonly used as a bearing material, in an axis pivot joint or hinge joint assembly where a shaft must rotate about some centerline within a journal, and/or electrical isolation is desired. When electrical isolation is desired, the sleeve may be combined with insulating flat washers to further assure electrical isolation. Assembling such a joint usually requires applying a clamp load via a bolt or other fastener means that compresses the sleeve and washers to create a secure hinge joint. A problem with assembling such hinge joints is that it is difficult to control the clamp load or compressive force applied to the sleeve and washers by a bolt or fastener acting as a hinge pin of the hinge joint. If a threaded fastener is used, the torque applied to the fastener during assembly of the hinge joint must be closely controlled so that the plastic used to form sleeve and washers is not overstressed by the clamp load, but gaps in the hinge joint are adequately closed to prevent squeak and rattle issues. A second problem for manufacturing is difficulty with the handling of the loose washer and sleeve parts, both with presentation of the parts and error proofing the presence of these small parts.

SUMMARY OF THE INVENTION

In accordance with one embodiment, an anti-rattle sleeve for coupling an object bracket to a mounting bracket to form a hinge joint is provided. The sleeve includes a body portion, a split end, and a flange end. The split end includes a retention feature that extends radially from the body portion and defines a slot configured to allow the retention feature to be pressed through an opening in the object bracket. The opening has an inner diameter smaller than an outer diameter of the retention feature when the sleeve is in a relaxed state. The flange end is opposite the split end. The flange end includes a flange portion that extends radially from the body portion and defines an inner flange face and an outer flange face opposite the inner flange face. The inner flange face includes an inner bump configured to contact an inner surface of the object bracket if the sleeve is inserted into the opening. The outer flange face includes an outer bump configured to contact an inner surface of the mounting bracket if the object bracket is coupled to the mounting bracket to form a hinge joint. The inner bump and the outer bump are located relative to the slot such that the sleeve is deformed by the inner surfaces in a manner effective to reduce relative motion between the object bracket and the mounting bracket when compressed therebetween.

In another embodiment, a hinge joint is provided. The hinge joint includes an object bracket, a mounting bracket, and an anti-rattle sleeve. The object bracket is configured to couple an object to the hinge joint and define an opening in the object bracket. The mounting bracket is configured to couple a mounting structure to the hinge joint. The anti-rattle sleeve is interposed between the object bracket and the mounting bracket. The sleeve includes a body portion, a split end, and a flange end. The split end includes a retention feature that extends radially from the body portion and defines a slot configured to allow the retention feature to be pressed through an opening in the object bracket. The opening has an inner diameter smaller than an outer diameter of the retention feature when the sleeve is in a relaxed state. The flange end is opposite the split end. The flange end includes a flange portion that extends radially from the body portion and defines an inner flange face and an outer flange face opposite the inner flange face. The inner flange face includes an inner bump configured to contact an inner surface of the object bracket if the sleeve is inserted into the opening. The outer flange face includes an outer bump configured to contact an inner surface of the mounting bracket if the object bracket is coupled to the mounting bracket to form a hinge joint. The inner bump and the outer bump are located relative to the slot such that the sleeve is deformed by the inner surfaces in a manner effective to reduce relative motion between the object bracket and the mounting bracket when compressed therebetween.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1A:
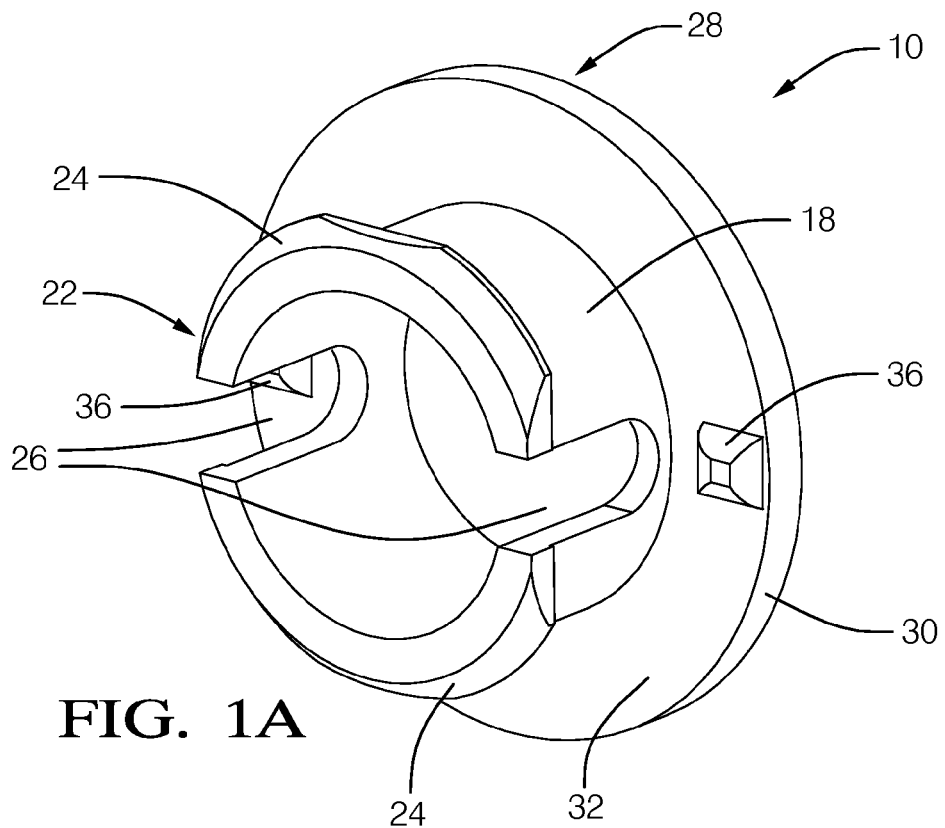
FIGS. 1A and 1B are alternative perspective views of an anti-rattle sleeve in a relaxed state in accordance with one embodiment.

Described herein is an anti-rattle sleeve comparable to a type 7 or a type 8 double flanged snap-in bearing available from Thomson Nyliner, a division of Danaher Specialty Products, based in Elizabethtown, N.C., USA. An improvement to these bearings is provided to overcome the problems described above.

FIG. 1 illustrates a non-limiting example of an anti-rattle sleeve, hereafter often referred to as the sleeve 10, for rotatably coupling an object bracket 12 (FIGS. 2-3) to a mounting bracket 14 to form a hinge joint 16. The hinge joint 16 described herein may be particularly desirable for automotive or other vehicle applications where vehicle vibrations can cause rattles that are annoying to an operator and/or passengers, thereby leading to customer dissatisfaction. The hinge joint 16 may be used to mount a device on a vehicle when the device needs to have an adjustable orientation relative to the vehicle. For example, the device may be an integrated radar and camera system proposed by Delphi Incorporated, with offices located in Troy, Mich., USA and elsewhere that is marketed under the name RACam, and is described in United States Published Application Number 2011/0163916 entitled INTEGRATED RADAR-CAMERA SENSOR, published Jul. 7, 2011 by Alland et al.

Preferably, the sleeve 10 is formed of an electrically insulating and semi-flexible material such as ZYTEL® MT409 manufactured by DuPont, which would be suitable for mounting the RACam device described above. The sleeve 10 includes a body portion 18 generally sized to fit within an opening 20 of the object bracket 12.

The sleeve 10 further defines a split end 22 that includes a retention feature 24 that extends radially from the body portion 18 and defines a slot 26 configured to allow the retention feature 24 to be pressed through the opening 20 in the object bracket 12. By way of example and not limitation, the opening 20 has an inner diameter of five millimeters (5 mm) that is smaller than an outer diameter of seven millimeters (7 mm) of the retention feature 24 when the sleeve 10 is in a relaxed state. As used herein, the relaxed state is used to describe the general shape of the sleeve before the sleeve is installed into the opening 20. If the slot has a width of two millimeters (2 mm), the sleeve 10 is able to distort by collapsing the slot 26 to allow the sleeve 10 is pushed through the opening 20. As will be recognized by those in the art, the example dimensions given above may be adjusted as necessary for, by way of example, smaller or larger bracket openings, different materials, or heaver or lighter devices. Once the sleeve 10 is inserted into the opening 20, the retention feature 24 advantageously serves to keep the sleeve 10 in place prior to subsequent assembly steps described infra.

The sleeve 10 further defines a flange end 28 opposite the split end 22, i.e.—on the opposite end of the body portion 18 as the split end 22. The flange end 28 generally includes or defines a flange portion 30 that extends radially from the body portion 18 and defines an inner flange face 32 and an outer flange face 34 opposite the inner flange face 32. The inner flange face 32 includes at least one inner bump 36 configured to contact an inner surface 38 of the object bracket 12 if or when the sleeve 10 is inserted into the opening 20. The outer flange face 34 includes at least one outer bump 40 configured to contact an inner surface 42 of the mounting bracket 14 if or when the object bracket 12 is coupled to the mounting bracket 14 to form the hinge joint 16 illustrated as assembled in FIG. 3.

Figure 1B:
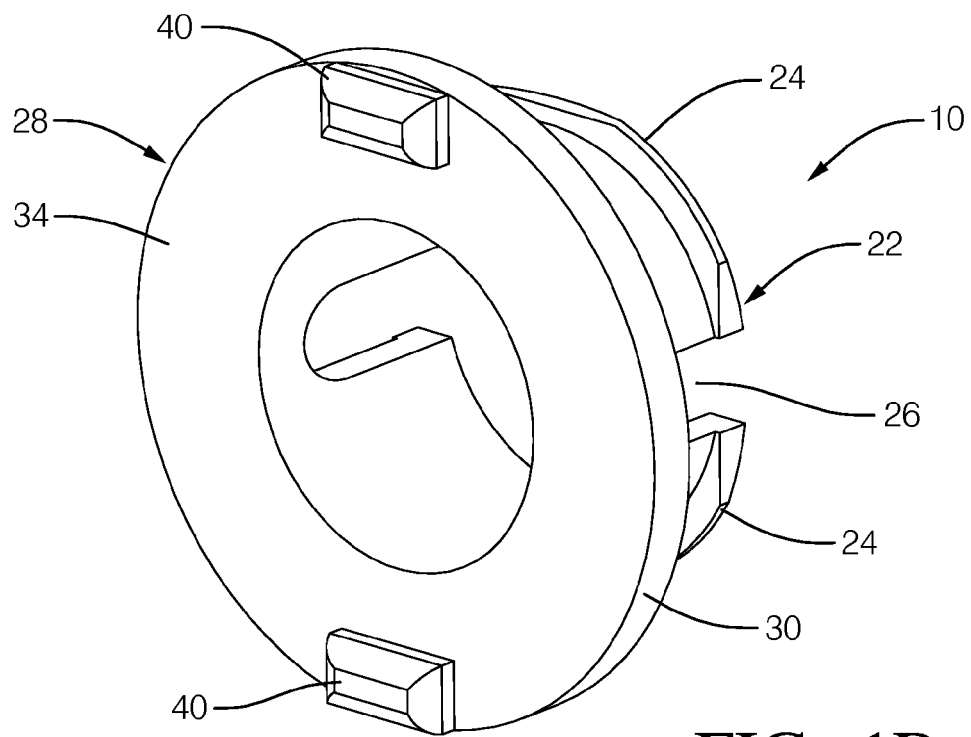
Figure 2:
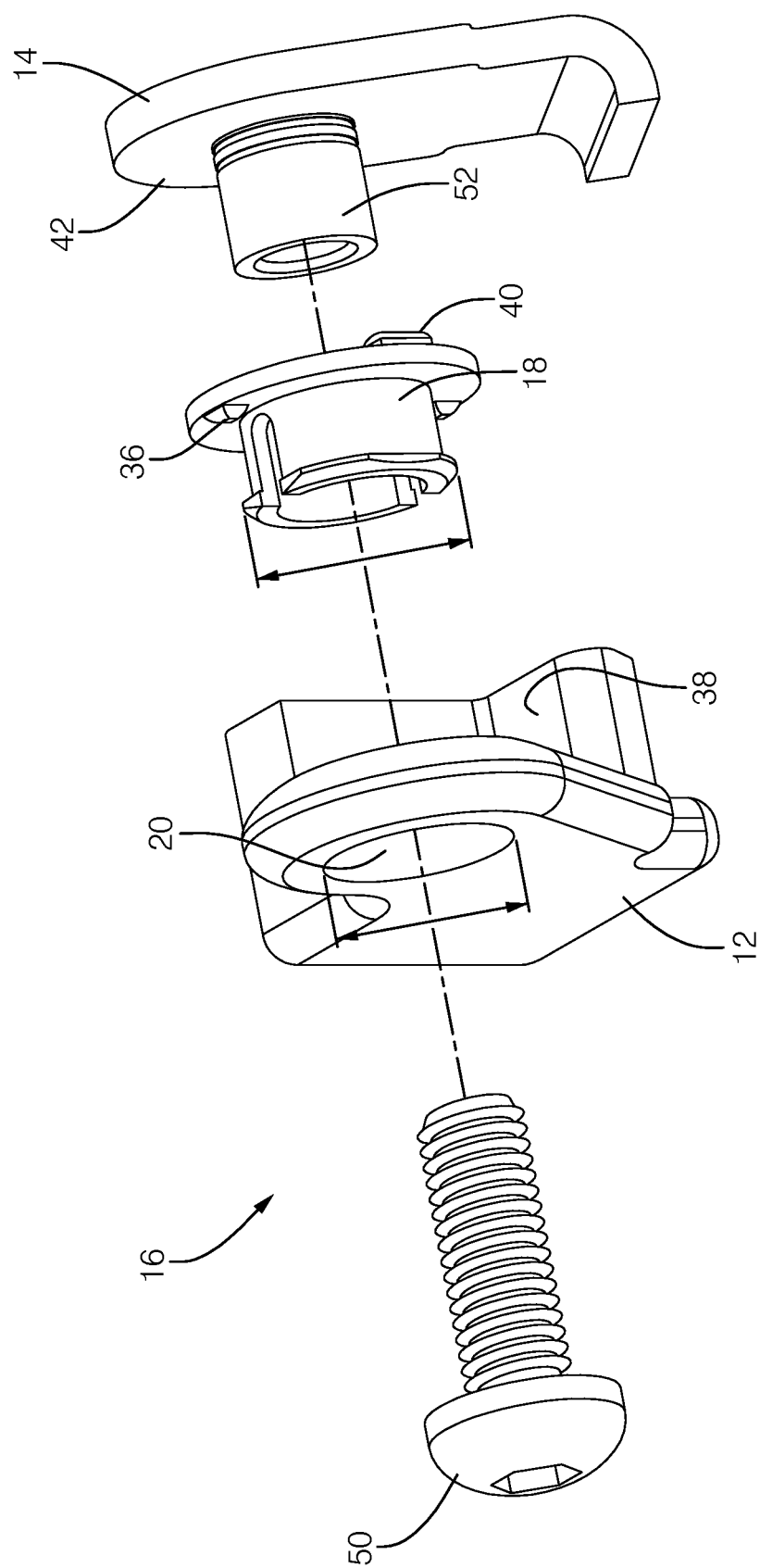
FIG. 2 is an exploded view of a hinge joint that includes the anti-rattle sleeve of FIGS. 1A and 1B in accordance with one embodiment.

Preferably, the inner bump 36 and the outer bump 40 are located relative to the slot 26 such that the sleeve 10 is deformed by the inner surfaces 38, 42 contacting the bumps 36, 40 in a manner that deforms or distorts the shape of the sleeve 10 relative to the relaxed state shown in FIGS. 1A, 1B, and 2 to be effective to reduce relative motion between the object bracket 12 and the mounting bracket 14 when compressed between the inner surfaces 38, 42. By way of further example and not limitation, if the sleeve 10 has one slot (26), the inner bump 36 may be aligned with the slot 26, and the outer bump 40 is preferably spaced apart from the inner bump by more than forty-five degrees)(45° of angle.

In the non-limiting example shown in FIGS. 1A, 1B, and 2, the sleeve 10 has two slots 26 arranged at one-hundred-eighty degrees)(180° of angle about the sleeve 10, and two inner bumps 36 aligned with the two slots 26. In this instance, it may be preferable for the outer bumps 40 to be arranged at ninety degrees)(90° of angle relative to the inner bumps 36. As such, the sleeve includes two slots located on opposites sides of the body portion 18, two inner bumps located on opposite side of the inner flange face and aligned with the two slots, and two outer bumps located on opposite sides of the outer flange face and aligned between the two inner bumps. Alternatively, there may be more than one outer bump 40 between each inner bump 36, for example two outer bumps arranged at sixty degrees)(60° of angle and one-hundred-twenty degrees)(120° of angle relative to the inner bumps 36.

In other alternative embodiments the sleeve 10 may have three, four, or more slots, especially if the sleeve is substantially larger than the example presented herein. Preferably, the flange portion 30 an inner bump 36 aligned with each slot 26, and an outer bump 40 about half-way between each inner bump 36.

Figure 3:
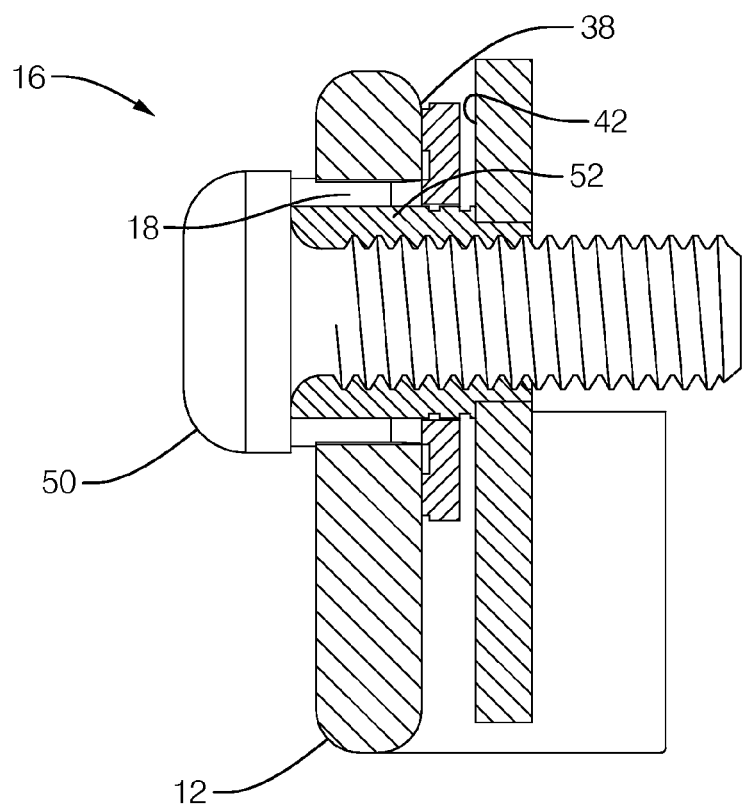
FIG. 3 is a cross section view of a hinge joint that includes the anti-rattle sleeve of FIGS. 1A and 1B in accordance with one embodiment.

FIGS. 2-3, introduced supra, further illustrate a non-limiting example of the hinge joint 16. The hinge joint 16 may include a fastener 50 configured rotatably couple the object bracket 12 to the mounting bracket 14. The fastener may be a threaded fastener, for example a screw or a bolt, or may be a deformable type fastener such as a rivet or the like. In order to limit the clamp load or compressive force that the fastener 50 applies to the sleeve 10, the mounting bracket 14 may include a spacer or post 52 attached to the mounting bracket 14 that is configured to be received within the body portion 18 of the sleeve 10 to limit the compression of the sleeve 10 when the hinge joint 16 is assembled.

Alternatively, the fastener 50 may be a shoulder bolt (not shown) or the like configured to extend an unthreaded portion (not shown) of the fastener 50 through the body potion 18 so the sleeve 10 can rotate about unthreaded portion or shoulder section the fastener 50. In this instance, the post 52 is not needed as the threaded portion of the fastener 50 is coupled directly to the mounting bracket 14 and thereby cooperates with the mounting bracket 14 to couple the object bracket 12 to the mounting bracket 14. Duplicating the missing feature of the post 52, the unthreaded portion of the shoulder bolt is configured to limit compression of the sleeve 10 when the hinge joint 16 is assembled. This configuration may be advantageous when the material used to form the mounting bracket is suitable for forming sufficiently strong threads for the fastener 50 to engage without providing the post 52, or the like.

Alternatively, the function of the post 52 may be replaced by a split tube (not shown) configured to be inserted into the body portion 18 of the sleeve 10 and receive the fastener 50 therethrough. As will be recognized by those in the art, the split tube includes a gap in the body of the split tube so the diameter of the split tube can decrease if necessary. In one embodiment, the split tube would be inserted into the body portion 18 of the sleeve 10 prior to inserting the sleeve/split tube assembly through the opening 20 of the object bracket. This pre-assembly of the sleeve/split tube assembly may be advantageous as it reduces the number of loose parts necessary to handle when assembling the hinge joint 16. Once assembled, the split tube serves to limit compression of the sleeve 10 when the hinge joint 16 is assembled. It is recognized that the tolerances of the various parts forming the hinge joint 16 may be such that the tube described above does not need to be a split tube but may be a non-split tube.

Figure 4:
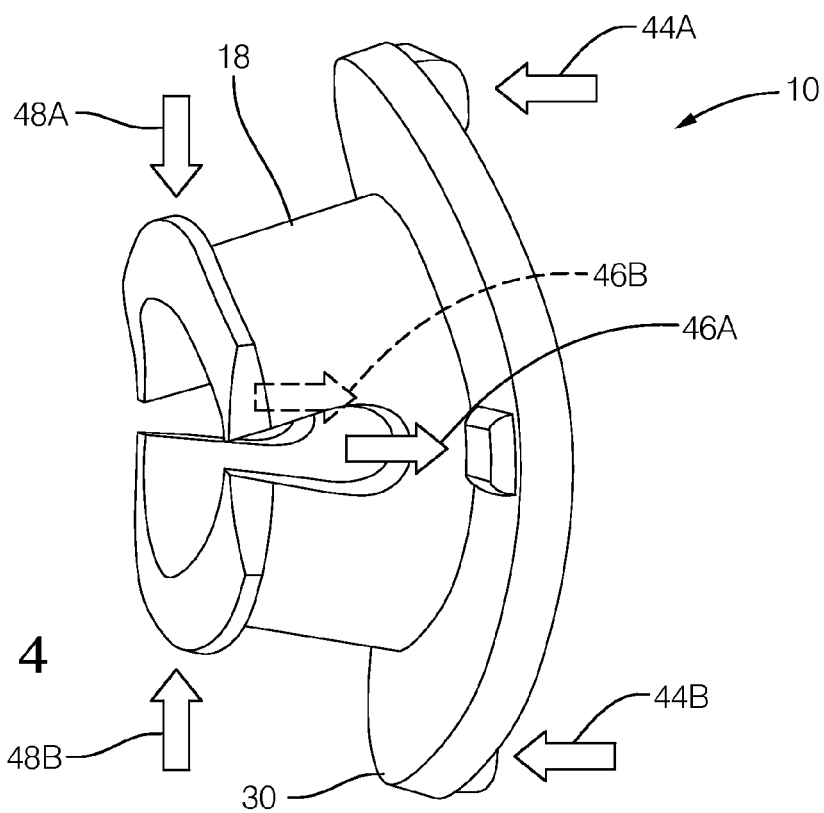
FIG. 4 is a perspective view of the anti-rattle sleeve of FIGS. 1A and 1B in a distorted state in accordance with one embodiment.

FIG. 4 illustrates a non-limiting example of the sleeve 10 in a distorted state. It is noted that this illustration is an exaggeration of the distortion caused by the sleeve being assembled and compressed by the object bracket 12 and the mounting bracket 14. Arrows 44A and 44B illustrate a force applied to the sleeve by the inner surface 38 of the object bracket 12, and arrows 46A and 46B (hidden from view) illustrates a force applied to the sleeve 10 by the inner surface 42 of the mounting bracket 14. It is noted that the object bracket 12 and the mounting bracket 14 are not included in the illustration only for the purpose of simplifying the illustration. Those in the art will recognize that forces necessary to keep the flange portion 30 distorted helps to create spring loaded action to reduce the occurrence of rattles, possibly arising from relative motion between the object bracket 12 and the mounting bracket 14.

As the flange portion 30 is distorted by the forces applied by the object bracket 12 (not shown) and the mounting bracket 14 (not shown), the body portion 18 is also distorted as illustrated by arrows 48A and 48B. This serves to press the body portion 18 against the post 52, against the unthreaded portion of the fastener if a shoulder bolt is used, or against the split tube is that alternative embodiment is used. Those in the art will recognize that such a pressing action is desirable to reduce the occurrence of rattles.

It is recognized that the inner bump 36 and the outer bump 40 also provide compressible crush surfaces so if the inner bump 36 and/or the outer bump 40 becomes fully deflected and bottoms out solid due to worst case tolerance stack-up, as the fastener load is further increased the inner bump 36 and/or the outer bump 40 will then become sacrificial in nature and will crush or deform against the object bracket 12 and/or the mounting bracket 14. This crushing is possible due to the small localized cross section of the bump and the softer material that the bump is constructed as compared to the two bracket materials. In other words, the bump will resize or compress shorter as needed. In contrast, if the hinge joint were constructed using a nylon washer with no bumps, and if the gap were closed completely so that the nylon washer was fully compressed, the bearing area of the nylon washer would be so high that it would be able to initially withstand the fastener load and the joint would be tight; the nylon washer is in the load path. This is an unfavorable situation since the nylon washer would eventually fail under this constant stress and likely break away resulting in a large gap.

Another variation that provides tolerance compensating ability is to thin down the thickness of the flange material that is proximate to a bump. The thinned surface could be accomplished by either a tapered thinning on the opposite side (the flange becomes thinner radially as you move from the center to the outside edge where the bump resides) or a localized stepped recess on the flange opposite the bump. The area of the recess may be much larger than the bump footprint itself allowing that region to "trampoline" as the bump is compressed providing much more movement than a non-recessed flange, and therefore more tolerance variation may be absorbed. It is recognized that this variation would double the amount of tolerance absorption possible.

Another variation of the sleeve 10 presented herein is that the bumps (the inner bump 36 and the outer bump 40) could be features on a washer without the body portion 18 or the split end 22. Then if items are being stacked on a shaft and a preload with no gaps is desired, such washers provide that preload both functionally and visually. As items are stacked (e.g.—bracket/washer/bracket/washer/bracket . . . ,) each washer is a spring-loaded contributor that will deform or bend as the stack-up is closed. If the total stack-up is compressed totally, the individual bumps can crush or deform as needed to compensate for that over-tightening event, all the while maintaining tightness on the entire joint. Even as the crushed areas wear, the preloaded flanges simply flex back toward their original shape thereby maintaining a tight gap-free stack-up.

Accordingly, a sleeve 10 and a hinge joint 16 that incorporates the sleeve 10 are provided. The process of assembling the sleeve 10 into the hinge joint 16 causes the shape of the sleeve 10 to be distorted from a relaxed state to a distorted state that creates an interference type fit between the object bracket 12 and the mounting bracket 14 in order to reduce the chance of rattles therebetween.

While this invention has been described in terms of the preferred embodiments thereof, it is not intended to be so limited, but rather only to the extent set forth in the claims that follow.

We claim:

1. An anti-rattle sleeve for coupling an object bracket to a mounting bracket to form a hinge joint, said sleeve comprising:
  a body portion;
  a split end that includes a retention feature that extends radially from the body portion and defines a slot configured to allow the retention feature to be pressed through an opening in the object bracket, wherein the opening has an inner diameter smaller than an outer diameter of the retention feature when the sleeve is in a relaxed state; and
  a flange end opposite the split end, wherein the flange end includes a flange portion that extends radially from the body portion and defines an inner flange face and an outer flange face opposite the inner flange face, wherein the inner flange face includes an inner bump configured to contact an inner surface of the object bracket when the sleeve is inserted into the opening, and the outer flange face includes an outer bump configured to contact an inner surface of the mounting bracket when the object bracket is coupled to the mounting bracket to form a hinge joint, wherein the inner bump and the outer bump are located relative to the slot such that the sleeve is deformed by the inner surfaces in a manner effective to reduce relative motion between the object bracket and the mounting bracket when compressed therebetween.

2. The sleeve in accordance with claim 1, wherein the sleeve is formed of an electrically insulating, semi-flexible material.

3. The sleeve in accordance with claim 1, wherein the sleeve includes two slots located on opposites sides of the body portion, two inner bumps located on opposite sides of the inner flange face and aligned with the two slots, and two outer bumps located on opposite sides of the outer flange face and aligned between the two inner bumps.

4. A hinge joint comprising:
  an object bracket configured to couple an object to the hinge joint and define an opening in the object bracket;
  a mounting bracket configured to couple a mounting structure to the hinge joint; and
  an anti-rattle sleeve interposed between the object bracket and the mounting bracket, wherein the sleeve includes
  a body portion,
  a split end that includes a retention feature that extends radially from the body portion and defines a slot configured to allow the retention feature to be pressed through the opening in the object bracket, wherein the opening has an inner diameter smaller than an outer diameter of the retention feature when the sleeve is in a relaxed state, and
  a flange end opposite the split end, wherein the flange end includes a flange portion that extends radially from the body portion and defines an inner flange face and an outer flange face opposite the inner flange face, wherein the inner flange face includes an inner bump configured to contact an inner surface of the object bracket when the sleeve is inserted into the opening, and the outer flange face includes an outer bump configured to contact an inner surface of the mounting bracket when the object bracket is coupled to the mounting bracket to form a hinge joint, wherein the inner bump and the outer bump are located relative to the slot such that the sleeve is deformed by the inner surfaces in a manner effective to reduce relative motion between the object bracket and the mounting bracket when compressed therebetween.

5. The hinge joint in accordance with claim 4, wherein the hinge joint includes a fastener configured to rotatably couple the object bracket to the mounting bracket.

6. The hinge joint in accordance with claim 5, wherein the mounting bracket includes a post configured to be received within the body portion of the sleeve and limit compression of the sleeve when the hinge joint is assembled.

7. The hinge joint in accordance with claim 5, wherein the fastener is a shoulder bolt configured to cooperate with the mounting bracket to couple the object bracket to the mounting bracket, wherein the shoulder bolt is configured to limit compression of the sleeve when the hinge joint is assembled.

8. The hinge joint in accordance with claim 5, wherein the hinge joint includes a split tube configured to be inserted into the sleeve and receive the fastener therethrough, wherein the split tube is configured to limit compression of the sleeve when the hinge joint is assembled.

\* \* \* \* \*